United States Patent
Van Der Weide

(10) Patent No.: US 7,674,310 B2
(45) Date of Patent: Mar. 9, 2010

(54) BIOLOGICAL FERTILIZER

(75) Inventor: Willibrordus Augustinus Van Der Weide, Strezeke (SK)

(73) Assignee: Condit International Limited, Limassol (CY)

( * ) Notice: Subject to any disclaimer, the term of this patent is extended or adjusted under 35 U.S.C. 154(b) by 0 days.

(21) Appl. No.: 10/580,223

(22) PCT Filed: Nov. 20, 2003

(86) PCT No.: PCT/EP03/13080

§ 371 (c)(1),
(2), (4) Date: Feb. 23, 2007

(87) PCT Pub. No.: WO2005/054155

PCT Pub. Date: Jun. 16, 2005

(65) Prior Publication Data

US 2007/0169526 A1 Jul. 26, 2007

(51) Int. Cl.
*C05F 11/08* (2006.01)

(52) U.S. Cl. .................. 71/8; 71/9; 71/10

(58) Field of Classification Search ........... 71/11–27, 71/8, 9, 10, 28
See application file for complete search history.

(56) References Cited

U.S. PATENT DOCUMENTS 3,914,438 A * 10/1975 Holt et al. ............ 426/61
4,333,757 A * 6/1982 Kurtzman, Jr. .......... 71/5
5,810,903 A * 9/1998 Branconnier et al. ..... 71/9

* cited by examiner

*Primary Examiner*—Wayne Langel
(74) *Attorney, Agent, or Firm*—Ladas & Parry LLP

(57) ABSTRACT

The present invention relates to a method for the preparation of a biological fertilizer comprising subjecting whey to a first fermentation step and the addition of a carrier material to the fermented whey and a biological fertilizer obtainable by the method. The biological fertilizer can be used as a replacement of the present artificial fertilizers thereby reducing many of the environmental problems associated with these artificial fertilizers. In addition, the biological fertilizer according to the present invention can be used in the field of biological agriculture for which, until the present biological fertilizer, no fertilizers were available.

8 Claims, No Drawings

BIOLOGICAL FERTILIZER

The present invention relates to methods for preparation of a biological fertilizer and a biological fertilizer obtainable by said method. The present invention further relates to a composition for fertilizing soil comprising said biological fertilizer, and the use of said biological fertilizer or said composition for fertilizing a substrate for plant growth. In addition, the present invention relates to a method for fertilizing soil.

A sustainable form of agriculture, i.e., one which does not simply exploit the inherited fertility of agricultural soils, is based on the premise that plant nutrients which are removed with the harvested crops will be replaced.

It is the regular supply of sufficient quantities of plant nutrients which has, over the past 100 years, maintained and even improved the fertility of farmers fields in Europe. Combined with advances in plant and animal breeding, plant protection, farm mechanization and land management, plant nutrition has been responsible for an increase in European farm output in recent years, in spite of a reduction in the total agricultural area.

Plant nutrients are available from four different sources: 1) soil itself, 2) livestock, municipal and industrial wastes, 3) biological nitrogen fixation, and 4) mineral fertilizers, also designated as artificial fertilizers.

Mineral fertilizers allow farmers to supplement plant nutrients, like trace elements, minerals, nitrogen, carbon, etc. and thus match the supply of nutrients with the needs of the crops. They are, in fact, the only nutrients which can be tailored to meet the crops' exact requirements. Providing guaranteed contents and the possibility of application as and when required. Mineral fertilizers are cost-effective means of achieving sustainable crop production and improvements in the quality of food and fodder. There is, at present, no alternative to mineral fertilizers on a regional or global scale if food supply is to be ensured.

A major drawback of mineral fertilizers is the ineffective use of the fertilizer due to the release pattern of the plant nutrients from the mineral fertilizer into the soil. Upon application to soil, the nutrients present in the mineral fertilizers are usually "burst" released, i.e., all nutrients are released into the soil in a relatively short period of time. Since during plant growth, which requires usually several months, the concentration of nutrients transiently decreases, due to, for example, wash out or degradation, a relatively large amount of nutrients has to be used to ensure sufficient plant nutrient concentrations during the entire growth period. Thus a relatively large portion of mineral fertilizer supplemented is needed to compensate for losses occurring during the growth period and not for the intended nutrient supplementation of the growing plants.

In addition, a relatively large portion of plant nutrients is not used by the growing plants. As a consequence, eventually the not-used plant nutrients are introduced into the environment, by, for example, wash out. Wash out is the washing out or away of nutrients in soil by for example rain, freshet, etc. This wash out of plant nutrients can cause causing severe environmental problems like oxygen depletion in water by algae growth, destruction of epitopes by "unnatural" nutrient supply, disruption of the natural balance between species like an abnormal nettle growth, and a general decrease in the number of species, both plant an animal, present in an epitope.

Therefore, it is a goal of the present invention to provide a cost-effective fertilizer which more effectively supplements nutrients to growing plants and thus reduces the amount of fertilizer needed and which, in addition, reduces the amount of plant nutrients introduced into the environment in order to minimalize or even eliminate environmental problems associated with this introduction. Because of the latter, such fertilizers are designated biological friendly or biological fertilizers as opposed to the present mineral (artificial) fertilizers.

According to the present invention, this goal is achieved by providing a method for the preparation of a biological fertilizer comprising a fermentation of whey and the addition of a carrier material to the fermented whey.

Whey is the watery part of milk that is separated from the coagulable part or curd, especially in the process of making cheese, and that is rich in lactose, minerals, and vitamins, and contains lactalbumin and traces of fat. At present, whey is considered a waste product of the cheese making industry and is usually discarded, thus providing a cost-effective starting material for a fertilizer.

In addition, since whey is a "natural" product, i.e., a product that has undergone minimal processing and contains no preservatives or artificial additives, when the carrier material used is also a "natural" product, the fertilizer based on whey as starting material does not introduce these possible toxic or harmful preservatives and/or additives into the environment in contrast to the chemically synthesized mineral (artificial) fertilizers.

This allows for the use of the biological fertilizer according to the invention by biological farmers, i.e., farmers which from a principal point of view do not use any "non-natural" products like mineral fertilizers, herbicides, or pesticides. Until now, no other fertilizers were available to these farmers severely limiting crop yields.

According to the invention, the whey is fermented in a first fermentation step, for example during 2 days at room temperature under stirring, although any fermentation protocol can be used like fermentation at elevated temperatures, fermentation in an automated fermentation device, etc.

The carrier material according to the invention, being preferably obtained from a "natural" source and in addition preferably in solid form, can be used to 1) provide a possible additional carbon source, 2) allow for improved transport and handling characteristics of the biological fertilizer, and 3) prevent wash out of the fermented whey after application.

The fermented whey in combination with the carrier material provides a fertilizer which supplies nutrients to soil in a "sustained" or "continued" release pattern, i.e., a relatively constant release of nutrients during a relatively long period, probably due to the postfermentation of the fertilizer by soil microorganisms after application.

A "sustained" release pattern requires less fertilizer as compared to a "burst" release pattern of (artificial) mineral fertilizers to achieve the desired nutrient concentration in soil since less compensation for an inevitable decrease in nutrient concentration is needed, thereby providing a more effective use of the biological fertilizer according to the invention compared with the (artificial) mineral fertilizers.

In addition, since less fertilizer is needed for compensation, also less fertilizer is introduced into the environment, eliminating or reducing the environmental problems associated with this introduction.

Preferably, the ratios between the fermented whey and the carrier material in the biological fertilizer according to the invention are between 10 to 15, like 10, 11, 12, 13, 14, or 15 (whey:carrier). Using these ratios, sufficiently texture is provided by the carrier material while optimally the benefits of fermented whey are maintained.

According to one embodiment of the present invention, the whey, prior to and/or during the fermentation, is inoculated with a culture of microorganisms, comprising either a single microorganism or a mixture of organisms. By adding a specific microorganism culture, the first fermentation process can be performed faster and/or a better control of the process is achieved. In addition, the characteristics of the fermented whey can be influenced depending on the microorganism of choice like the nitrogen and/or carbon content.

The fermentation of the whey is preferably carried out at pH 5 to 7, like pH 5, 5.5, 6, 6.5, or 7, more preferable at pH 4 to 4, 5, like pH 4, 4.1, 4.2, 4.3, 4.4 or 4.5, since at these pH's optimal fermentation is achieved.

In a second embodiment of the present invention, prior to the addition of carrier material, the fermented whey is filtrated to separate the microbial biomass. Preferably, the principle of gravity feeding is used in the larger time scale. This allows for a low cost filtration step.

According to a third embodiment of the present invention, after addition of the carrier material, a second fermentation of the product obtained is performed. This second fermentation further improves the availability of nutrients in the biological carrier.

According to yet another embodiment of the present invention, lime is added to the biological fertilizer. In addition to improvement of the texture of the biological fertilizer, lime adds an addition calcium source to the biological fertilizer.

Because of the negative influence of gum resin on the optional second fermentation step, and on the possible post-fermentation process, the carrier material according to the invention preferably is a gum resin-poor carrier material. In addition, the accumulation of biomass in the fermentation process(es) can further be optimized by using a carrier material which is cellulose-rich. Specific examples of the carrier material according to the present invention are saw dust, beech saw dust, oak saw dust, dried nettle, etc.

In order to meet specific requirements, and depending on the intended use, additives can be added to the biological fertilizer like trace elements, nutrients, minerals, growth hormones, stabilizers, organic compounds, antibiotics, etc.

Preferably, the biological fertilizer according to the present invention is in the form of a powder, granules, a suspension, a dispersion, fibrous matter, a solution, a mixture, or combinations thereof.

The biological fertilizer can be used in a composition comprising the biological fertilizer and any substances which are normally used in the field As already outlined above, the biological fertilizer according to the present invention is especially suited to be used for fertilization of a substrate for plant growth because of the "sustained" release pattern. Examples of suitable substrates are soil, vermiculite, glass fibers, rockwool, and/or aquaculture.

According to another embodiment of the present invention, the biological fertilizer is used in a method for fertilizing soil comprising: application of a biological fertilizer or a composition according to the present invention onto and/or into soil.

It was surprisingly found that not only nutrients are effectively supplied to soil but also soil composition and/or soil structure are improved. One possible mechanism for the observed improvement can be the addition of microorganisms to soil. The microorganisms enhance flora and fauna resulting in an improved resistance against diseases, more worms, an improved digestion of other organic materials, etc., The present invention will further be illustrated in the following examples. These examples should not be construed as limiting.

EXAMPLE

Preparation of a Biological Fertilizer According to the Present Invention

The biological fertilizer according to the invention was prepared by subjecting whey, obtained from a cheese production facility, to a first fermentation step. The whey was stirred at room temperature during two days to incorporate the nutrients in the whey like Ca, K, N, C etc, into the forming biomass. After two days, the product obtained in the first fermentation step was filtered by gravitation filtration in order to increase the dry material content of the preparation. After discarding the liquid phase, wood dust was added to the material remaining on the filter and the combined material was allowed to ferment in a second fermentation step at room temperature.

The percentage of elements was measured and the results are shown in table 1

TABLE 1

| element analysis of the biological fertilizer according to the present invention. | | | | | | | | |
|---|---|---|---|---|---|---|---|---|
| Element | C | O | H | N | P | K | Ca | S | other minerals |
| percentage | 34 | 31 | 5 | 8 | 2 | 1 | 3 | 3 | 180 |

The invention claimed is:

1. Method for the preparation of a biological fertilizer comprising:
   subjecting whey to a first fermentation step;
   subjecting the fermented whey to a filtration step;
   adding a cellulose-rich carrier material to the filtered fermented whey at a ratio of fermented whey to carrier material of between 10 and 15; and
   subjecting the mixture of cellulose-rich carrier material and filtered fermented whey to a second fermentation step.

2. Method according to claim 1, further comprising, prior to and/or during the first fermentation of the whey, the inoculation of the whey with a culture of microorganisms.

3. Method according to claim 1, wherein the first fermentation is performed at a pH between 5 and 7.

4. Method according to claim 1, further comprising the addition of lime.

5. Method according to claim 1, wherein the carrier material is a gum resin-poor carrier material.

6. Method according to claim 1, wherein the carrier material is selected from the group consisting of saw dust, beech saw dust, oak saw dust, dried nettle, and combinations thereof.

7. Method according to claim 1, further comprising the addition of trace elements, nutrients, minerals, growth hormones, stabilizers, organic compounds, and/or antibiotics.

8. Method according to claim 1 wherein the biological fertilizer is in a form selected from the group consisting of a powder, granules, a suspension, a dispersion, fibrous matter, a solution, a mixture, and combinations thereof.

* * * * *